United States Patent
Nichols et al.

[15] 3,679,154
[45] July 25, 1972

[54] HEAVY LIFT HELICOPTER WITH VERTICALLY ADJUSTABLE COCKPIT

[72] Inventors: John B. Nichols; Roger L. Gamaunt, both of Manhattan Beach, Calif.

[73] Assignee: Hughes Tool Co., Aircraft Division, Culver City, Calif.

[22] Filed: July 21, 1970

[21] Appl. No.: 56,932

[52] U.S. Cl. ..................244/17.11, 244/118 R, 244/137 R
[51] Int. Cl. .......................................................B64c 27/04
[58] Field of Search ..................244/17.11, 118 R, 120, 121, 244/137 R; 212/59

[56] References Cited

UNITED STATES PATENTS

| 3,038,684 | 6/1962 | Bradbury | 244/17.11 |
| 3,433,439 | 3/1969 | Brame et al. | 244/121 X |
| 3,450,376 | 6/1969 | Rusanovich et al. | 244/137 R |

*Primary Examiner*—Milton Buchler
*Assistant Examiner*—Paul E. Sauberer
*Attorney*—Smyth, Roston & Pavitt

[57] ABSTRACT

A helicopter for use in transporting large loads and having a cockpit movably connected to the main body fuselage by a parallelogram linkage which may be actuated by the pilot and/or load operator for increasing visibility when loading the helicopter and providing easy access to its interior.

8 Claims, 8 Drawing Figures

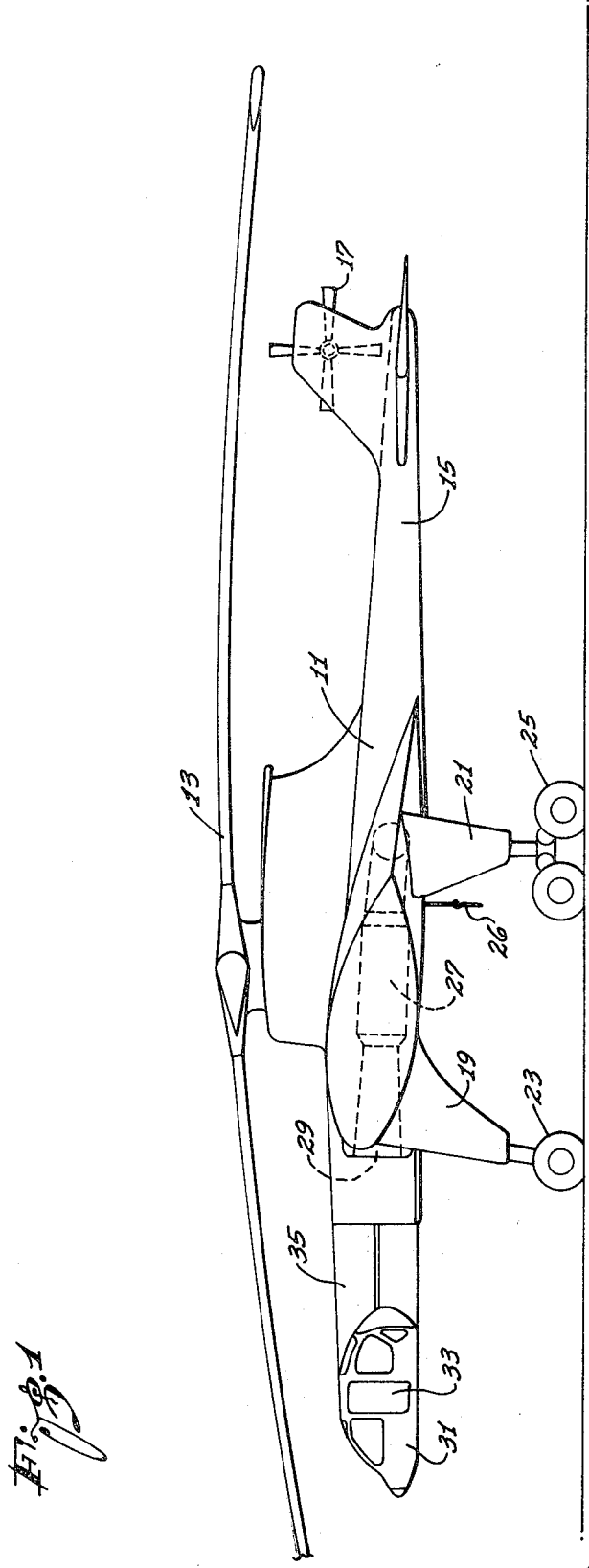

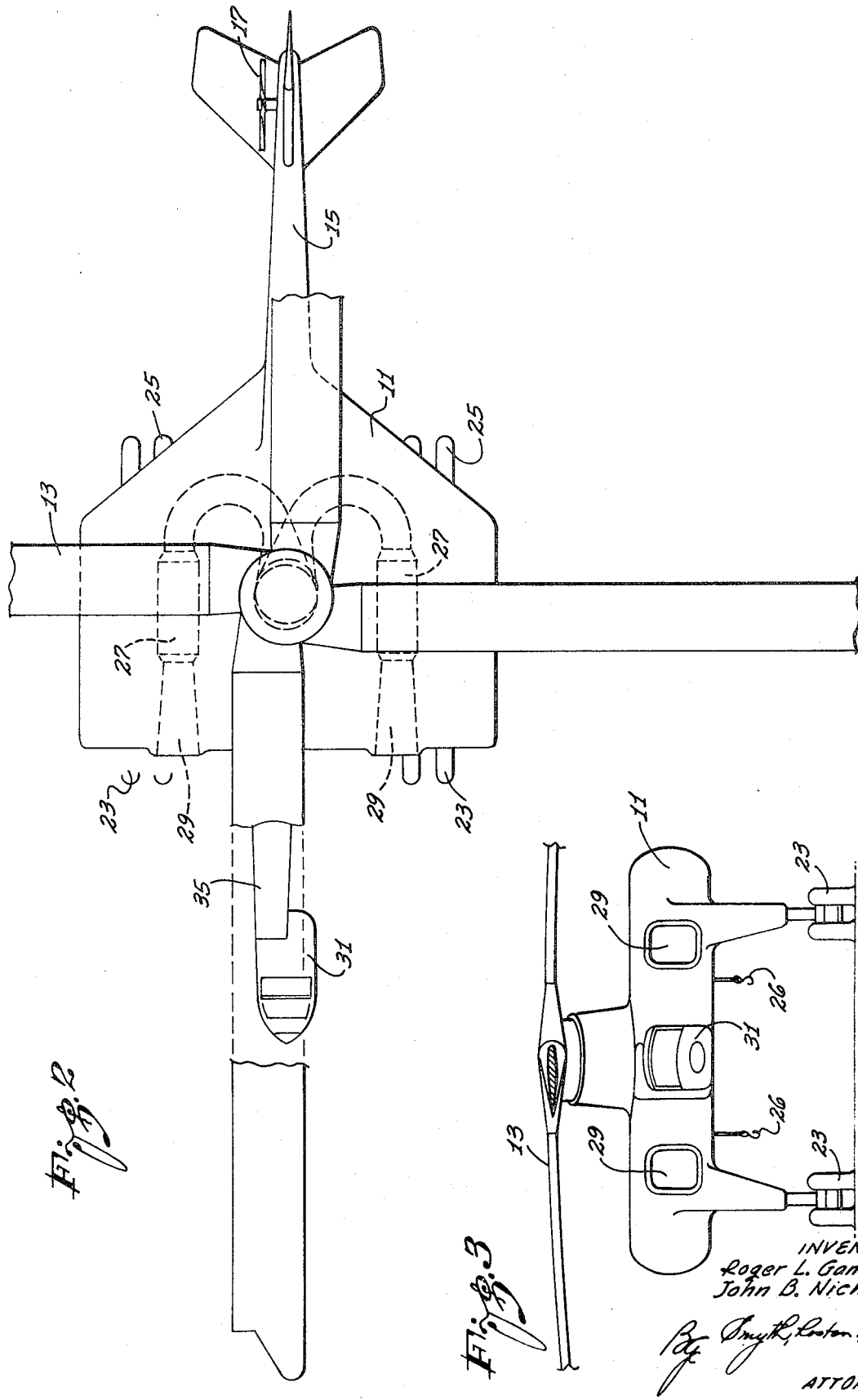

INVENTORS:
Roger L. Gamaunt
John B. Nichols

ATTORNEYS

INVENTORS:
Roger L. Gamaunt
John B. Nichols

ATTORNEYS

3,679,154

HEAVY LIFT HELICOPTER WITH VERTICALLY ADJUSTABLE COCKPIT

BACKGROUND OF THE INVENTION

In most of the well-known cargo-handling helicopters available, the main body portion is mounted on a plurality of large wheel struts so that the helicopter may be positioned over the load for attachment thereto.

It has been common to locate the cockpits of such helicopters in positions forward and below the main body fuselage so that the load operator can look out a window at the rear end of the cockpit and taxi the helicopter in a reverse direction over the load which is to be picked up. The load is then attached to the lower portion of the fuselage. This operation is similar in many respects to the handling of cargo containers in that such machines drive over and straddle the load they are to carry.

Due to the fact that the cockpit is positioned in front of and below the horizontal level of the main body, it is impossible to position the helicopter relative to most loads except by backing the craft over the load. Further, it is relatively difficult, if not impossible, to carry long loads with these helicopters since the position of the cockpit would cause the load to extend so far to the rear of the helicopter as to seriously affect stability.

SUMMARY OF THE INVENTION

The present invention relates to an improved load-carrying helicopter having a cockpit which is adjustable relative to the cargo-carrying main body. This feature allows greater loading versatility of the helicopter and greater ease in the manner in which the helicopter can be maneuvered to pick up its loads.

More specifically, a helicopter formed in accordance with the present invention is provided with a cockpit which is movably mounted on the forward end of the main body fuselage for adjustment in a vertical plane. The adjustability of the cockpit height relative to the ground allows the helicopter pilot or load operator to taxi the helicopter over a load to be transported by moving the helicopter either forward or backward over the load.

Additionally, if the cockpit is adjusted so that, in its lowermost position, it is adjacent the ground, it can be used as a convenient entryway for personnel who may then walk through a passage connecting the cockpit to the fuselage so as to load the interior of the craft, be seated as passengers, or gain access to the main propulsion equipment for maintenance and repair.

Any suitable cockpit adjustment structure may be provided but, if desired, a parallelogram linkage may be utilized which also may cooperate with a set of adjustable steps within the section interconnecting the cockpit and the body so that a person traversing the section would always be able to stand upright.

Further advantages, objects, modes, and embodiments of this invention will become obvious to those skilled in the art by reference to the Detailed Description and accompanying drawings which illustrate what is presently considered to be a preferred embodiment of the best mode contemplated for utilizing the novel principles set forth in the claims.

BRIEF DESCRIPTION OF THE DRAWINGS

FIG. 1 is a partial side elevation of a helicopter formed in accordance with the present invention;

FIG. 2 is a partial top plan view of the helicopter illustrated in FIG. 1;

FIG. 3 is a front view of the same helicopter;

DETAILED DESCRIPTION

Figure 4:
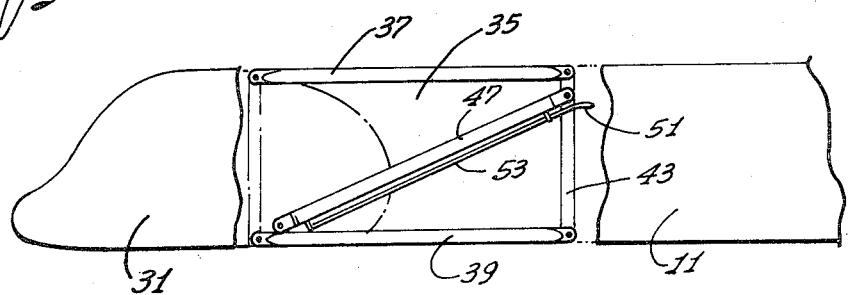
FIGS. 4 and 5 are simplified side elevations of the cockpit, illustrating a mechanism which may be utilized to adjust its position relative to the fuselage and the ground.

Referring now to the drawings in greater detail, there is shown a helicopter having a main body fuselage 11 upon which is mounted a main propulsion rotor 13. A tail section 15 is also connected to the main body and supports a tail rotor 17.

The helicopter is supported by a suitable set of struts 19 and 21 which carry ground contact wheels 23 and 25.

A load may be straddled by the struts 19 and 21 and attached to the underside of the fuselage for transport by suitable means such as hooks 26.

Propulsion for the helicopter is generated by a pair of engines 27 which ingest air via air intakes 29.

A cockpit 31, having a door 33, is adjustably mounted, by means which will be described, to the main body portion of the helicopter via a connecting section 35. In addition to the usual windows for pilot visibility, a window 36 is positioned at the rear of the cockpit.

Figure 5:
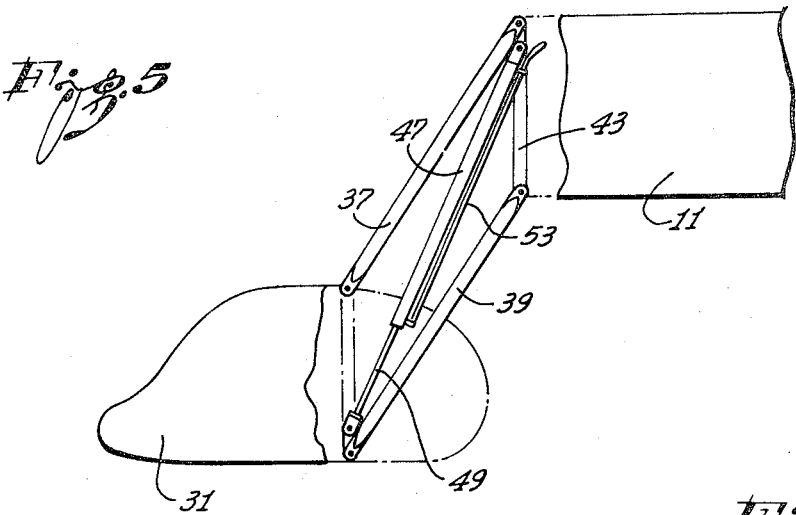
Figure 6:
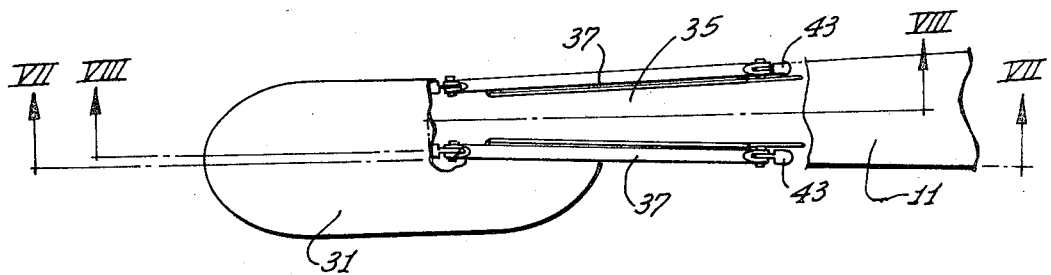
FIG. 6 is a top plan view of the structure shown in FIGS. 4 and 5.

Referring now to FIGS. 4-6, it can be seen that the main body 11 and the cockpit 31 are connected by two sets of pivoted links or rods 37 and 39, the links 37 being at the upper portion of the structure and the links 39 being at the lower portion thereof. The forward ends of the links 37 and 39 are connected by the body of the cockpit which acts as a link between the links 37 and 39. This effect is illustrated in phantom in FIG. 4. The rear ends of links 37 and 39 are connected by a pair of vertical support links 43. In other words, the links 37, 39, and 43 on each side of the structure 35, together with the body of cockpit 31, form a parallelogram. The links may be connected to one another at the illustrated pivot points so as to allow the parallelogram to be moved between the positions shown in FIGS. 4 and 5.

Any suitable control structure may be used to alter the shape of the parallelogram, thereby regulating the position of the cockpit. By way of example, there has been shown a hydraulic cylinder 47 relative to which a piston rod 49 may be telescopically actuated inwardly and outwardly. The cylinder and rod may be pivotally attached to the link 39 and support 43 at substantially diagonally opposed positions on the parallelogram. When hydraulic fluid is passed through a line 51, the piston rod 49 will tend to be driven out of the cylinder 47, thereby causing the parallelogram to be deformed into the shape illustrated in FIG. 5. On the other hand, when fluid is passed through a line 53, the piston rod will be drawn into the cylinder 47, causing the parallelogram shape to return to that illustrated in FIG. 4.

Consequently, the cockpit can be positioned relative to the ground and the main body at any elevation desired by the operator.

Figure 7:
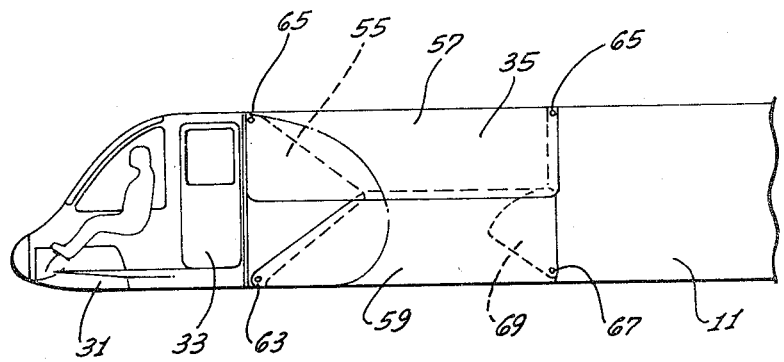
FIGS. 7 and 8 illustrate various details of the cockpit adjustment structure as seen along a line VII—VII and VIII—VIII, respectively, of FIG. 6.
Figure 8:
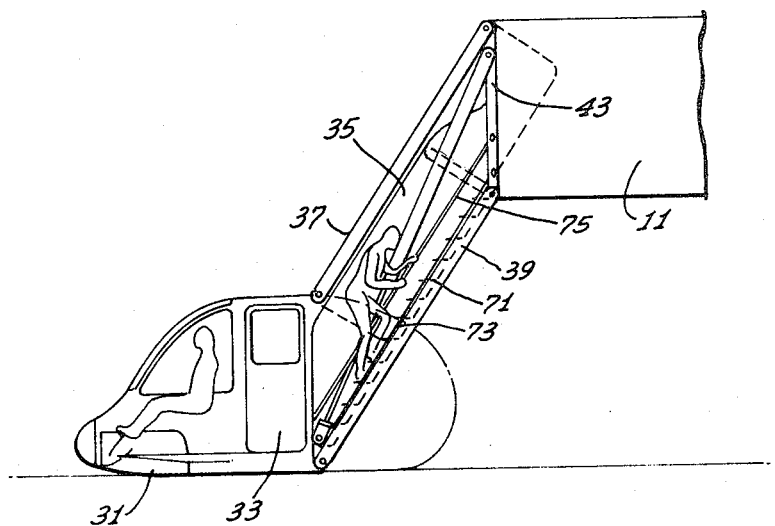

As can be seen in FIGS. 7 and 8, the section 35 may thus be provided with an exterior skin which encloses the section and protects it from exposure to wind and weather, regardless of its elevation.

As shown, the cockpit 31 is provided with a triangular member 55 to which an upper skin section 57 and a lower skin section 59 are pivoted at points 61 and 63, respectively. The upper skin section 57 may also be pivoted to the main body 11 at point 65, and the lower section 59 may be pivoted at 67 to a lower end of a triangular extension 69 of the main body portion 11.

Comparing FIGS. 7 and 8, as the cockpit is lowered, the skin sections will remain interrelated in such a way that the interior of the section 35 remains protected. The provision of suitable sealing means between the skin sections will insure that such protection is adequate.

As shown in FIG. 8, a flight of steps 71 may each be pivotally mounted on a pair of links 73, each extending parallel to the opposed parallelogram links 39. Links 73 are pivotally attached to link 43 and link 39. The leading edges of the steps may each be connected to the links 73 so that, as the cockpit is moved toward the raised position, each step becomes flattened to form a floor surface within the section 35. However, when the cockpit is moved toward the lowered position, the steps are pivoted upwardly, relative to the links 39, so as to provide convenient foot supports for passengers and personnel. Another link 75 may also be pivoted to the links 43 and 39 to serve as a handrail for persons using the steps as a ladder.

In a helicopter equipped with this movable cockpit, the load operator can raise the cockpit and taxi the helicopter over the load to be transported. Suitable devices may then be actuated to secure the load to the helicopter which may then lift off. If desired, the load control operator may depress the cockpit at any time during the loading or unloading in order to maintain unobstructed vision of the operation; his cargo-handling ability is consequently increased.

Further, if desired, the operator can taxi the helicopter in reverse so as to move it over the load in a manner similar to that in which prior art helicopters are used. The use of the adjustable cockpit also allows passengers and crew members to enter and leave the aircraft without having to use cumbersome ladders which must be extended and retracted.

With this disclosure the applicants have provided an embodiment of a new and improved concept in the helicopter art which yields a true advance in that art.

Many modifications and alterations of that embodiment, as well as other embodiments, will be obvious to those skilled in the art, wherefore what is claimed as the invention is:

1. In a helicopter comprising a main body section, a plurality of struts for supporting said main body section when the helicopter has landed, and load attachment means on the lower surface of said main body portion for carrying a load positioned intermediate said struts, the improvement comprising:
   a cockpit mounted on said main body section and
   means for adjusting the vertical elevation of said cockpit between
      a first position in a substantially horizontal plane with said main body portion and
      a second position substantially below said main body section.

2. The helicopter of claim 1 wherein said adjusting means comprises
   a plurality of link means forming a geometric figure, and
   means attached to said plurality of link means for altering the shape of the geometric figure.

3. The helicopter of claim 1 including
   a connecting section intermediate said main body section and said cockpit, said adjusting means extending through said connecting member.

4. The helicopter of claim 3 including
   ladder means within said connecting section comprising
      a plurality of steps and
      means interconnecting said steps for maintaining the foot-contact surface of each step in a horizontal plane in all positions of vertical elevation adjustment of said cockpit.

5. The helicopter of claim 1 wherein
   said second position is adjacent the ground surface when said helicopter has landed.

6. A helicopter comprising
   a main body fuselage,
   propulsion means mounted on said fuselage,
   a cockpit attached to said fuselage,
   adjustable means connecting said cockpit to said fuselage for adjusting the position of said cockpit relative to said fuselage, said adjustable means comprising a plurality of link means pivotally connected together so as to form a parallelogram, and
   means for varying the shape of the parallelogram formed by said link means.

7. The helicopter of claim 6 wherein
   said varying means comprises
      a hydraulic cylinder attached to one of said link means of the parallelogram and
      a piston rod extending telescopically from a position within said cylinder and attached to another of said link means in the parallelogram.

8. A helicopter comprising
   a main body fuselage,
   propulsion means mounted on said fuselage,
   a cockpit attached to said fuselage,
   adjustable means connecting said cockpit to said fuselage for adjusting the position of said cockpit relative to said fuselage, and
   means in said adjustable connecting means providing passage means for personnel moving through said connecting means between said cockpit and said main body fuselage.

* * * * *